(12) United States Patent
Ratermann

(10) Patent No.: US 7,438,085 B2
(45) Date of Patent: Oct. 21, 2008

(54) PROTECTION AND TAMPER NOTIFICATION DEVICE FOR USE WITH A VALVE

(76) Inventor: George W. Ratermann, 601 Pinnacle Pl., Livermore, CA (US) 94550

( * ) Notice: Subject to any disclaimer, the term of this patent is extended or adjusted under 35 U.S.C. 154(b) by 413 days.

(21) Appl. No.: 10/807,043

(22) Filed: Mar. 22, 2004

(65) Prior Publication Data

US 2004/0244836 A1 Dec. 9, 2004

Related U.S. Application Data

(60) Provisional application No. 60/456,895, filed on Mar. 21, 2003.

(51) Int. Cl.
*F16K 35/10* (2006.01)

(52) U.S. Cl. .................. 137/379; 137/382; 220/270; 220/725

(58) Field of Classification Search ............... 137/377, 137/379, 381, 382; 220/724–727, 375, 270; 222/53.06, 562, 543, 724, 153.06, 153.07; 215/306
See application file for complete search history.

(56) References Cited

U.S. PATENT DOCUMENTS

| | | | | |
|---|---|---|---|---|
| 1,158,631 A * | 11/1915 | Caldwell | ...................... | 70/180 |
| 1,473,751 A | 11/1923 | Walker | | |
| 1,796,398 A | 3/1931 | Richardson | | |
| 2,177,359 A | 10/1939 | Baker | ........................... | 220/29 |
| 2,179,886 A | 11/1939 | Baker | ........................... | 137/78 |
| 2,613,462 A | 10/1952 | Johnson | ........................... | 40/10 |
| 2,703,546 A | 3/1955 | Allen | ........................... | 116/114 |
| 2,727,526 A * | 12/1955 | Nickle | ........................... | 137/382 |
| 3,009,483 A | 11/1961 | Salustri | ........................... | 138/109 |
| 3,406,708 A | 10/1968 | Maydock | ........................... | 137/382 |
| 3,678,717 A | 7/1972 | Eaton | ........................... | 70/232 |
| 3,696,964 A | 10/1972 | Deakin | ........................... | 220/85 P |
| 3,831,300 A | 8/1974 | Berkhouse | ........................... | 40/21 B |
| 4,266,813 A * | 5/1981 | Oliver | ........................... | 285/12 |
| 4,380,247 A | 4/1983 | Douglas | ........................... | 137/382 |
| 4,458,923 A | 7/1984 | Burroughs | ........................... | 285/8 |
| 4,640,031 A | 2/1987 | Hoek et al. | ........................... | 40/306 |
| 4,827,643 A | 5/1989 | Hearst et al. | ........................... | 40/306 |
| 4,834,137 A | 5/1989 | Kawaguchi et al. | ........................... | 137/557 |
| 4,899,781 A | 2/1990 | Monroe | ........................... | 137/382 |
| 5,121,859 A * | 6/1992 | Stull | ........................... | 222/153.06 |
| 5,152,313 A | 10/1992 | Chapman, Jr. | ........................... | 137/382 |

(Continued)

*Primary Examiner*—John Rivell
*Assistant Examiner*—Cloud K Lee
(74) *Attorney, Agent, or Firm*—Schneck & Schneck; Thomas Schneck

(57) ABSTRACT

A device for prevention of particulate contamination of a valve fitting and for notification of whether actual access or tampering or potential access or tampering of a fluid from a fluid tank connected to the valve and/or the valve has occurred, featuring a fitting block which is insertable within the fitting or capable of receiving the fitting, and first and second straps bendable about the valve and fastenable to each other. One of the straps may include a ring through which a valve burst disk is insertable when the strap is bent about the valve. If the device was compromised and the cylinder was removed for access to the valve fitting, the ring of one of the straps would remain on the burst disk even though the cylinder was removed from the fitting. Thus, the compromised device would remain on the valve indicating that access to the valve or fluid had been attempted or achieved.

15 Claims, 5 Drawing Sheets

U.S. PATENT DOCUMENTS

| | | | |
|---|---|---|---|
| 5,152,314 A * | 10/1992 | Yandle, III | 137/382 |
| 5,160,065 A * | 11/1992 | Libes et al. | 220/724 |
| 5,238,141 A | 8/1993 | Callegari et al. | 220/725 |
| 5,295,601 A * | 3/1994 | Bostelman | 220/287 |
| 5,297,697 A * | 3/1994 | Boring | 222/83 |
| 5,386,924 A * | 2/1995 | Flinta et al. | 220/284 |
| 5,417,349 A * | 5/1995 | Stull | 222/420 |
| 5,555,655 A | 9/1996 | Yager et al. | 40/306 |
| 5,664,597 A * | 9/1997 | Miskiewicz | 137/15.02 |
| 6,000,419 A | 12/1999 | Bernhard | 137/15 |
| 6,003,714 A * | 12/1999 | Buermann | 220/270 |
| 6,247,491 B1 | 6/2001 | Petryna | 137/382 |
| 6,415,946 B2 | 7/2002 | Carlo et al. | 220/724 |
| 6,463,953 B1 * | 10/2002 | Cuzzo et al. | 137/296 |
| 6,691,732 B2 * | 2/2004 | Fleury et al. | 137/296 |
| 6,783,031 B2 * | 8/2004 | Robbins et al. | 222/111 |
| 2002/0100520 A1 | 8/2002 | Olsen et al. | 141/346 |

* cited by examiner

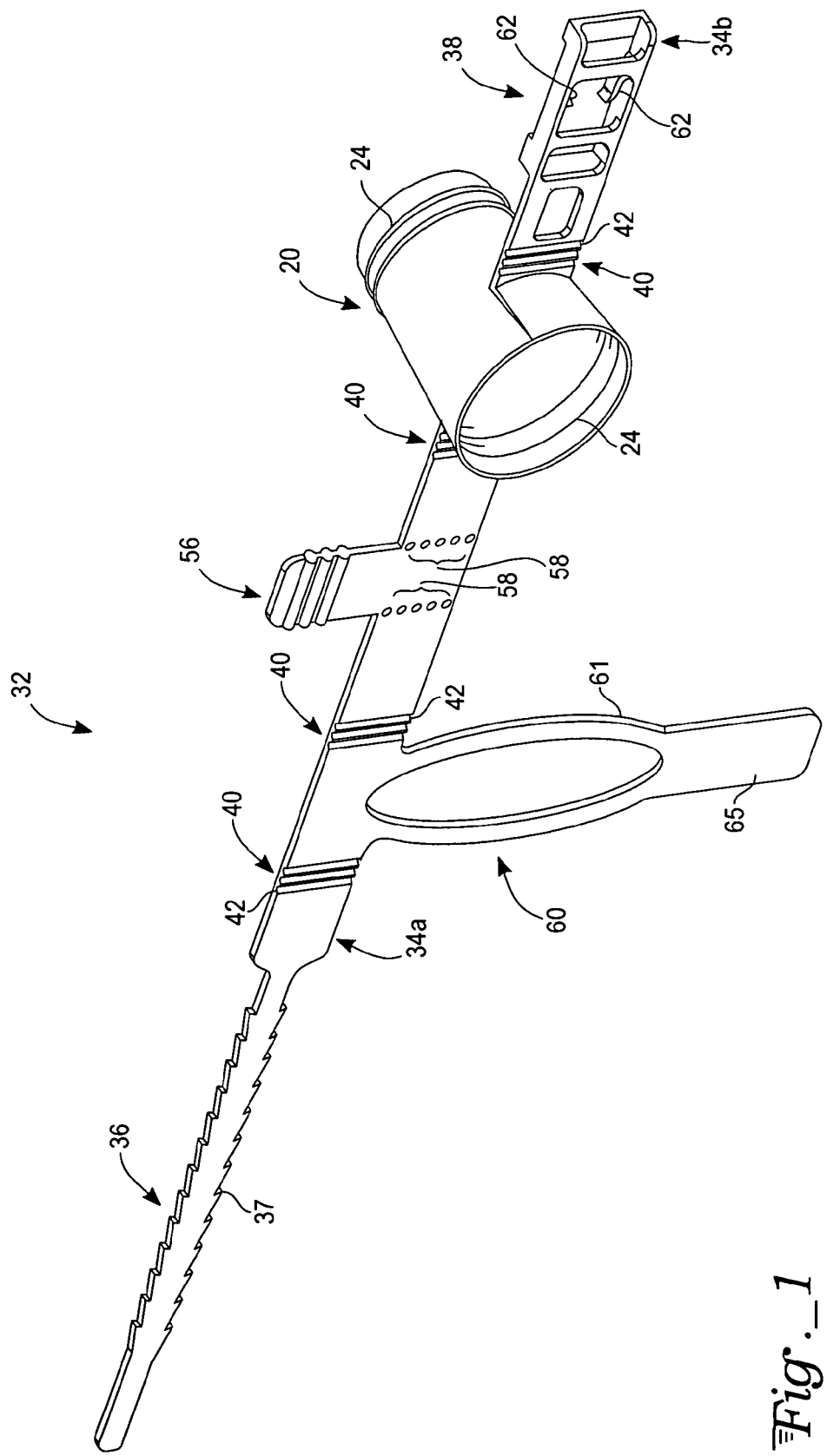
Fig._1

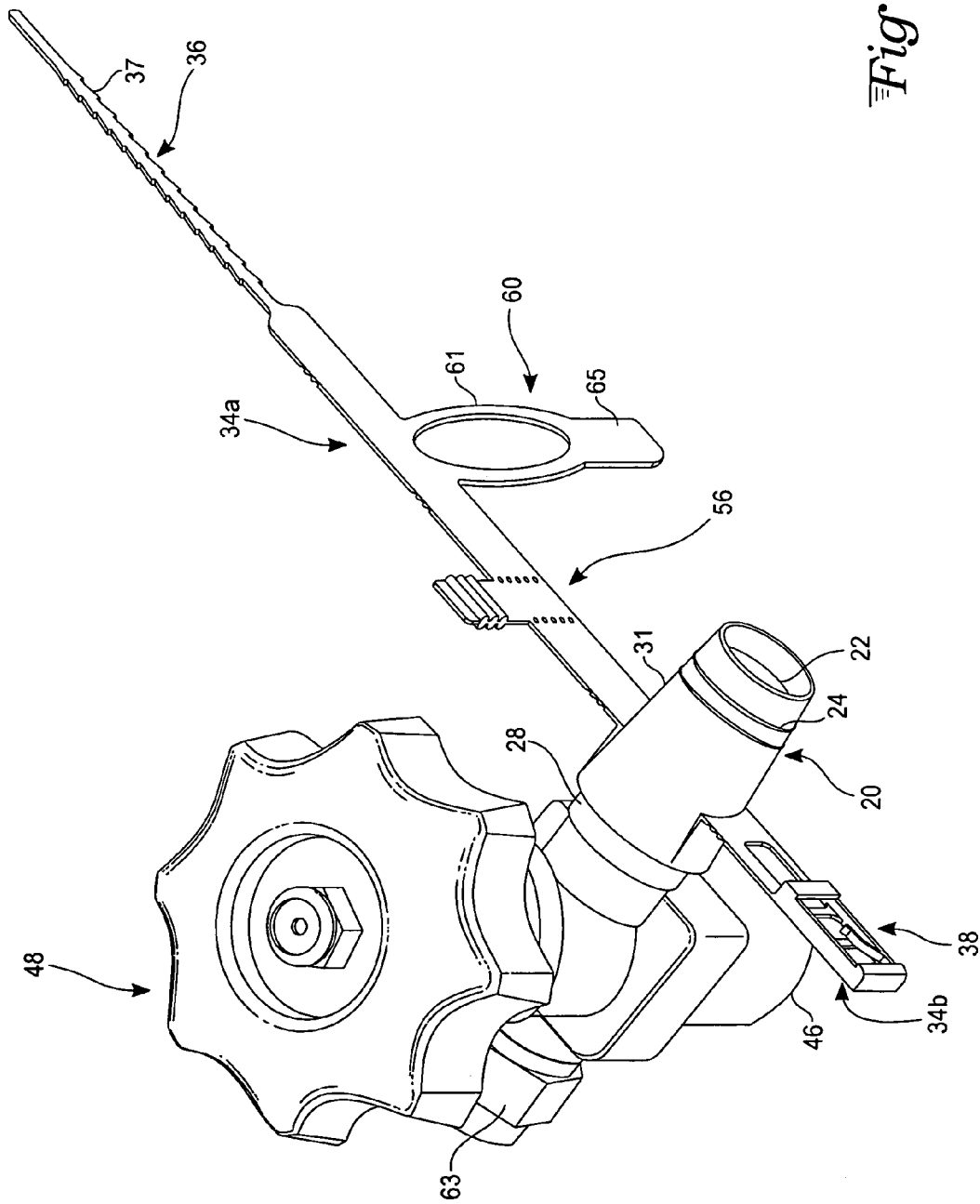
Fig. _2

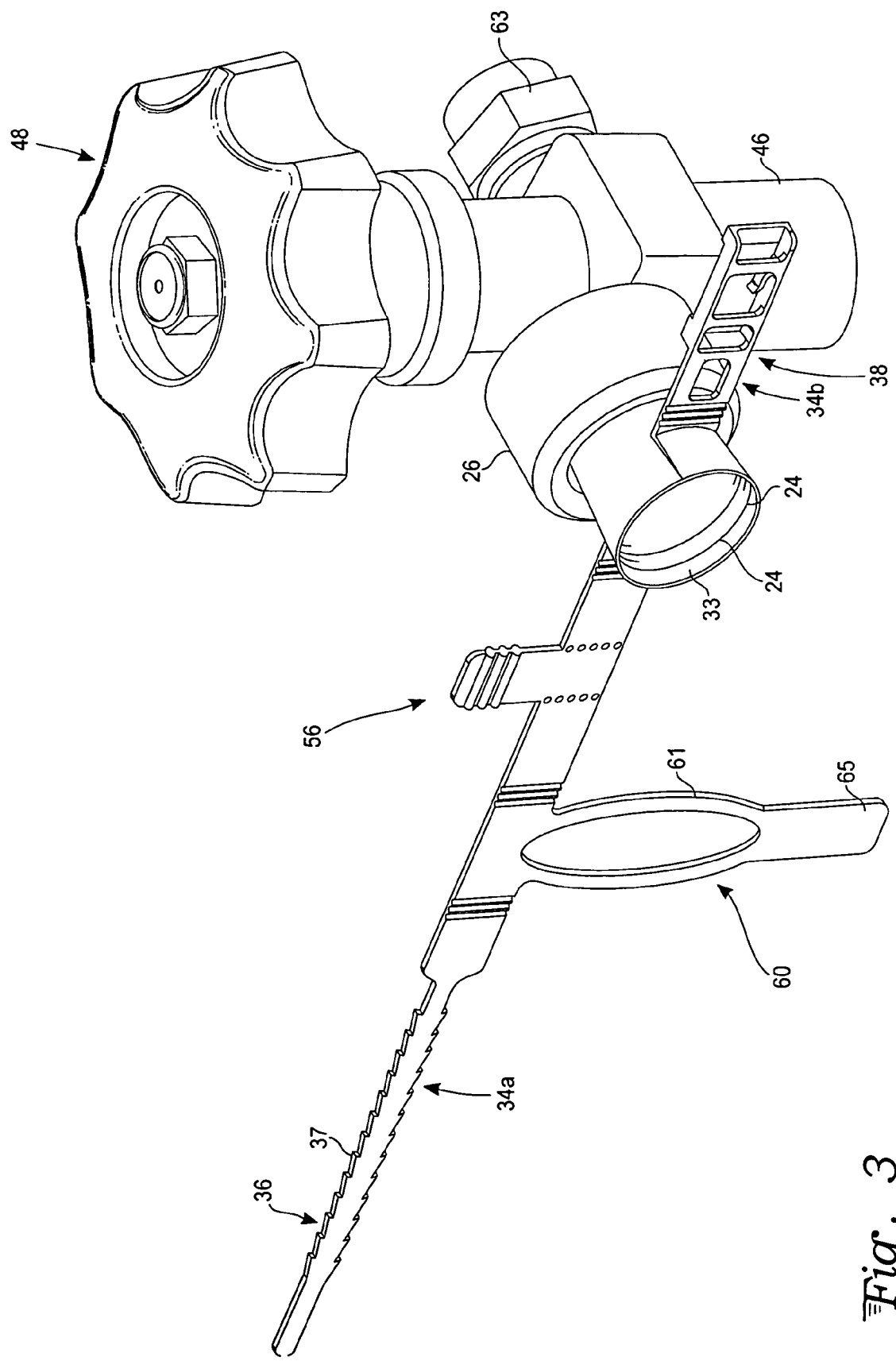
Fig._3

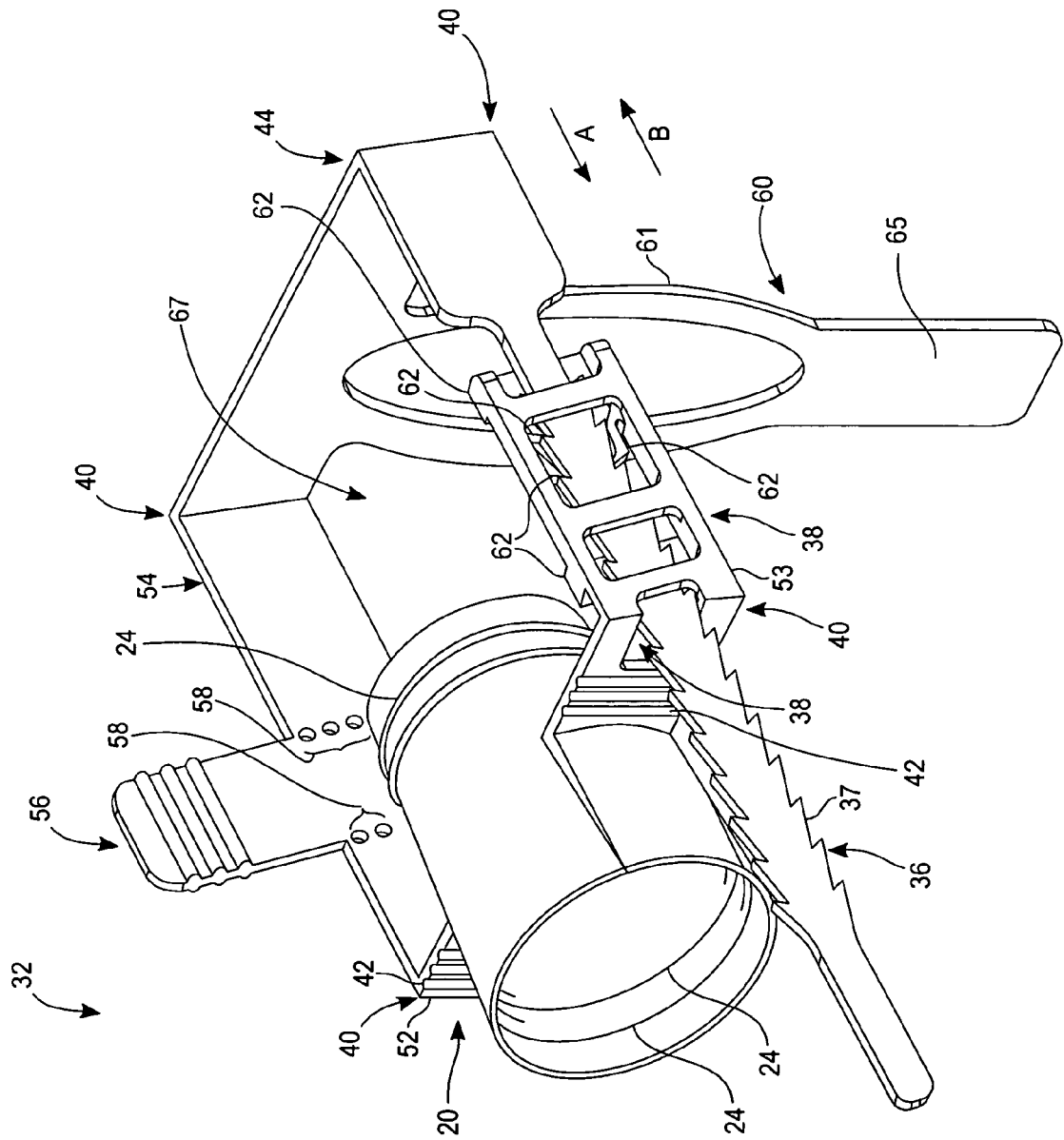
Fig._4

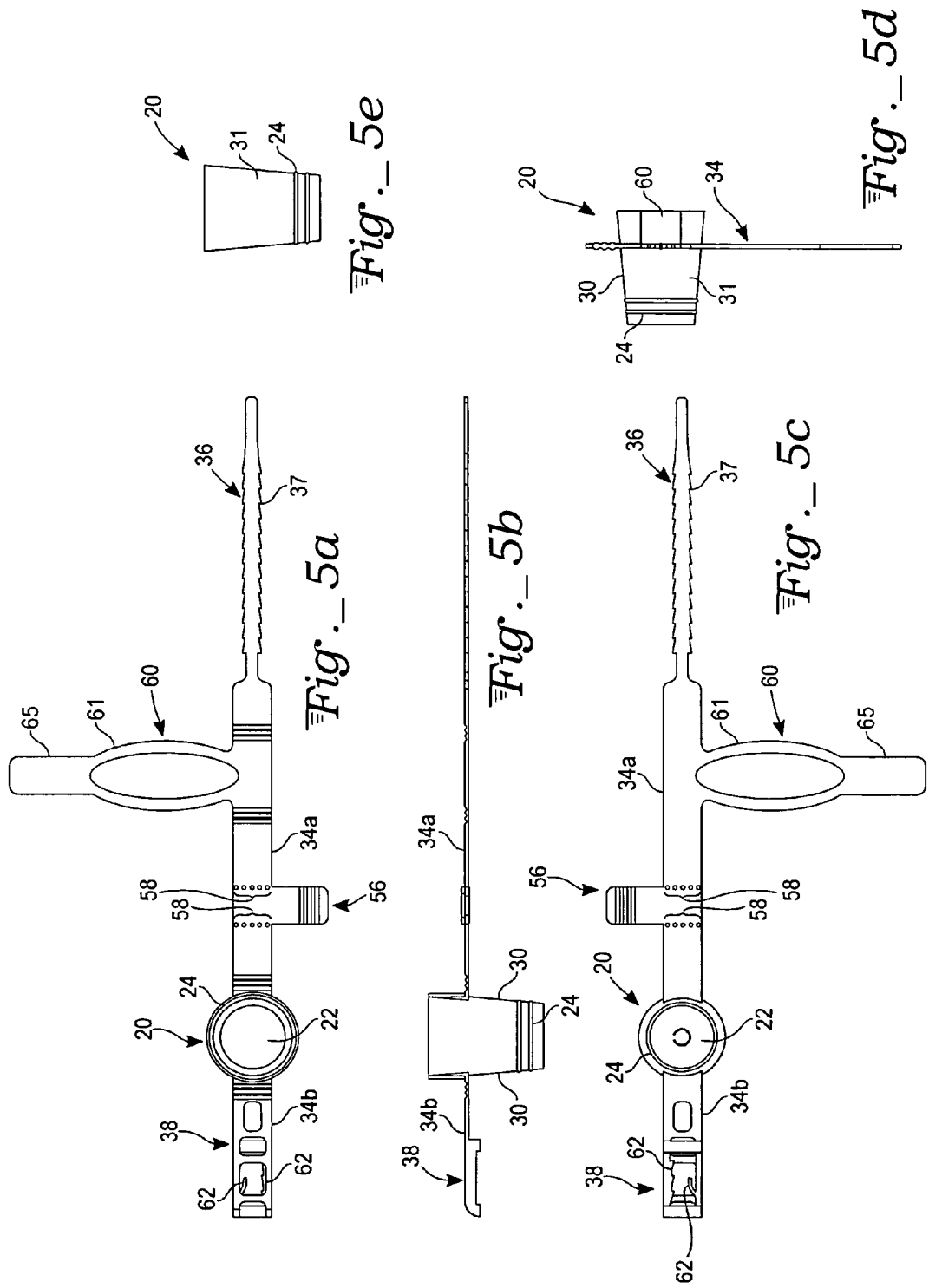

PROTECTION AND TAMPER NOTIFICATION DEVICE FOR USE WITH A VALVE

CROSS-REFERENCE TO RELATED APPLICATION

This application claims priority from U.S. provisional application no. 60/456,895, filed Mar. 21, 2003.

FIELD OF THE INVENTION

The invention relates, in general, to fluids stored in tanks and, in particular, to a device for notification of tampering, and prevention of particulate contamination of fluid stored in tanks.

BACKGROUND ART

Industrial fluid is commonly stored in cylinders and tanks and is supplied to fluid distribution systems used in various industries through connections to the cylinders. Fluid distribution systems include devices to regulate or distribute gas, and pipe or tubing connecting the devices in the distribution system. The fluid cylinders typically have, or are connected to, a valve connectable to the distribution system for transfer of fluid from the cylinder to the fluid distribution system.

The valve fitting(s) used to connect the cylinder to the distribution system is often susceptible to particulate contamination as contaminants may find their way into the fitting. Thus, when a connection is made between the fluid distribution system and the fitting, particles in the fitting likely enter into the distribution system as a connection is made. This may jeopardize the integrity of the fluid being distributed and may have devastating consequences in the industry.

Plugs, known in the art, are used to plug up or cap the fitting before a connection is made to the fluid distribution system such that at least some particles are prevented from collecting in the fittings. Therefore, it is less likely that contamination of the fluid will occur upon connection of the tank with the fluid distribution system. However, the size of a fitting connected to each cylinder may vary. Therefore, multiple sizes of plugs are required to properly plug up or cap the different sized fittings. Further, fittings include threads for connection to the fluid distribution systems. In some fittings the threads are located on an outside surface, while in other fittings the threads are located on an inside surface of the fitting.

Therefore, it is an object of the present invention to provide a protection mechanism that will protect several different sizes and types of fittings.

In many situations, the fluids stored within the cylinder are utilized in medical and food and beverage applications. Contamination of fluids used in these situations may have negative health and safety implications. Therefore, it is important to be able to determine whether a party had access to the valve fitting connected to the tank and was thus presented with an opportunity to dispense fluid from the cylinder or, to perhaps even tamper with the fluid within the cylinder or the valve. Further, it is important to be able to determine or to be notified of whether an opportunity for particulate contamination of the fitting arose.

Therefore, it is an object of the present invention to provide a notification device.

SUMMARY OF THE INVENTION

These and other objectives have been achieved by a protection and tamper notification device having a fitting block, such as a tapered cylinder with a base, receivable by or capable of receiving a valve fitting, attached to and disposed between a first strap and a second strap. The straps are bendable about the valve which is connectable to a fluid tank and are fastenable to each other upon enclosing the valve. In order to access the valve fitting, the enclosure must be broken or otherwise compromised. The compromised enclosure provides notification that the valve was made accessible and that the fluid within the tank and/or the fitting may have been accessed or tampered with or that the fitting may have been exposed to contaminants. In one embodiment, the blocking means may include a plug of the prior art.

In one embodiment, the first strap includes a ring through which a burst disk of a valve in insertable. When the device enclosing the valve has been compromised so that the blocking means may be removed from the fitting, the device likely remains on the valve because the burst disk remains inserted within the ring of the first strap, and provides notification that the valve was made accessible or exposed and that the fluid within the tank and/or the fitting may have been accessed or tampered with. Notification of fitting exposure or of access or attempted access to a fitting, such as a valve fitting connected to a fluid tank, is desired to prevent negative health or safety implications that may result from contamination or tampering.

The tapered cylinder with a base is used as a means for preventing particulate contamination of a fitting, on its own, and in conjunction with the protection and tamper notification device described above. The tapered cylinder includes securing means on an outer surface and on an inner surface. In one example, the securing means are threads. The tapered cylinder has threads on the outside, so it may be threaded into a valve fitting having threads on the inside. The valve fitting acts as a receiver of the tapered cylinder. Further, because the tapered cylinder has threads on the inside, it may act as a receiver. The tapered cylinder may be threaded about the valve fitting having threads on the outside.

In another example, the tapered cylinder includes tangs on an outer and on an inner surface as securing means. The tapered cylinder with tangs on the outside may be pushed into a valve fitting. The tangs of the cap act as a receiver of the thread of the valve fitting, similar to how the tangs of a milk cap receive a thread of a milk bottle. The tapered cylinder with tangs on the inside may be pushed over a valve fitting, the tangs on the inner surface receiving the thread of the valve fitting.

Additionally, the tapered surface/sides of the cylinder allow fittings of various sizes to be threadably received by the tapered cylinder and allow the cylinder to be threaded into fittings of various sizes. This is an improvement over plugs of the prior art, where various sized plugs were required to plug fittings of various sizes. It can be said that the tapered cylinder acts a universal blocking means for fittings. A variety of different sizes of tapered cylinders may be used in the present invention.

BRIEF DESCRIPTION OF THE DRAWINGS

FIG. 1 is a perspective view of a protection and tamper notification device of the present invention.

FIG. 2 is a perspective view of the protection and tamper notification device of FIG. 1 receiving a fitting.

FIG. 3 is a perspective view of the protection and tamper notification device of FIG. 1 received within a fitting.

FIG. 4 is a perspective view of the protection and tamper notification device of FIG. 1 in a fastened position.

FIG. 5a is a top view of the protection and tamper notification device of FIG. 1.

FIG. 5b is a side view of the protection and tamper notification device of FIG. 5a.

FIG. 5c is a bottom view of the protection and tamper notification device of FIG. 5b.

FIG. 5d is a partial side view of the protection and tamper notification device of FIG. 5c.

FIG. 5e is a side view of a tapered cylinder shown in the protection and tamper notification device of FIG. 1.

DETAILED DESCRIPTION OF THE INVENTION

With reference to FIG. 1, there is shown a protection and tamper notification device 32 of the present invention featuring a fitting block which is, in one example, a cylinder 20 having tapered sides 30 and a base 22 (FIGS. 5a and 5c). It can be said that the tapered cylinder with the base is a thimble, as it may be shaped similarly to a thimble having tapered sides. In operation, the tapered cylinder 20 is threaded or pushed into or about a fitting, such as valve fitting 26 or 28 (FIGS. 3 and 2). Where the fitting block is a plug, of the prior art, the plug is inserted within or about the fitting 26 or 28. The fitting block prevents at least some particles, such as dust, from entering the fitting and from potentially contaminating fluids from a fluid cylinder or tank (not shown) in connection with the fitting 26 or 28. Fitting 26 and fitting 28 are each typically connected to a fluid distribution system (not shown) when fluid dispensation is desired. The invention will be described below with regard to the tapered cylinder 20, however other fitting blocks may be utilized with the device 32.

Referring to FIGS. 1 and 4, the protection and tamper notification apparatus 32 further includes bendable or flexible straps 34a and 34b. Strap 34a has a tongue 36 with a saw edge 37 and strap 34b has a tongue housing 38. Straps 34a and 34b may be integral or separate. The tongue 36 is received within the tongue housing 38 upon enclosing of valve 48. The straps 34 are bent at bendable portions 40 (FIG. 4) about valve 48 (FIGS. 2 and 3). In one example, the bendable portion 40 may include an indentation or channel 42 or a series of indentations or channels 42 within the straps 34 that facilitate the bending of the straps and/or provide the user with a selection of locations in which the straps will bend relatively easily. The straps may comprise, for example, a bendable plastic or rubber material. When bent at appropriate sections, the straps 34 form a fence 44 (FIG. 4), which may be square shaped, around valve 48 (FIGS. 2 and 3) connected to the fluid cylinder or tank. The fluid cylinder (not shown) is typically attached to valve base 46. A front portion of the fence 44 includes a wall 52 on one side of the tapered cylinder 20 that may or may not include channels 42, and a portion of the tongue receiver 38 on the other side of the tapered cylinder. A left side portion of the fence 44 includes a wall 54 featuring a tab 56 with perforations 58 on either side of the tab 56 down the height of the wall 54. A rear portion of the fence includes a needle eye portion 60, including a ring 61 and an extended base 65, in the strap 34a. The needle eye 60 is large enough to allow a burst disk 63 (FIGS. 2 and 3) on another end of valve 48 to be received within the ring. A right side portion of the fence includes a wall 53, and tongue housing 38, through which the saw edged tongue 36 is insertable so that the valve 48 is fenced in within opening 67. The tongue 36 is inserted within the tongue housing 38 in a direction indicated by arrow A locking the apparatus.

Upon attempts to remove the tongue 36, in a direction indicated by arrow B, saw edges 37 of the tongue 36 contact and press against various protrusions 62 of the tongue receiver 38. Therefore removal of the tongue is prevented. Another strap locking or fastening mechanism besides the tongue and tongue receiver may be used.

Before access to the fitting is provided so that the fitting may be made available for connection and fluid communication with the fluid distribution system, the tapered cylinder 20 must be removed from the fitting. In order to remove the tapered cylinder 20 from the fitting, the tamper protection and notification apparatus 32 must somehow be removed. A party is prevented from removing the tongue 36 from the tongue receiver 38 without breaking, cutting, or otherwise compromising the strap 34 or other portions of the device 32. The apparatus 32 is secured tightly about the valve 48 therefore may not be lifted and removed. Also, the locking mechanism is intended to prevent a user from removing the tamper notification apparatus 32, including the tapered cylinder 20, by way of unlocking the lock, without compromising the device. Therefore, the protection and tamper notification apparatus 32 would typically be removed by cutting through the tamper notification apparatus 32. It may be cut by pulling down on the tab 56 at the perforations 58 thus breaking the strap 34a and allowing for removal of the tapered cylinder 20. It may be compromised with other methods. Once the tamper notification apparatus is compromised, a party will be made aware that the fitting 26 or 28 was made available for connection with the fluid distribution system, and thus will be put on notice that fluid from the cylinder may have actually or potentially been dispensed or otherwise tampered with or that the valve itself, including the fitting, may have been tampered with and at the very least exposed to particles.

The compromised device 32 may serve as proof that the valve 48 and/or the fluid within the fluid cylinder was made accessible and possibly tampered with.

Further, where the device 32 includes the ring 61 through which burst disk 63 is inserted, the device will typically remain on the valve 48, serving as evidence that the device was compromised and that the valve 48 and/or the fluid within the fluid cylinder was made accessible and possibly tampered with.

Referring to FIGS. 2, 3, and 5a-5e, the tapered cylinder 20 will be described in more detail. The tapered cylinder 20 may be utilized in conjunction with the device 32 or separately from the device 32. The tapered cylinder has sides 30 tapering to a base 22 and securing means 24 disposed on an outer surface 31 and on an inner surface 33 of the tapered cylinder. In one example, the securing means include a pair of tangs that receive a thread on the valve fitting. In another example, the securing means include threads. As stated above, the tapered cylinder includes a base 22. The base 22 acts as a block preventing at least some particles from entering the fitting. The tapered cylinder 20 may comprise, for example, plastic, metal, or other desired material. If the tapered cylinder has threads on the outer surface, it may be threaded into a fitting 26 having threads on an inner surface (not shown). If the tapered cylinder has tangs 24 on the outer surface it may be pushed into valve fitting 26 having threads on an inner surface to receive the threads. For example, tangs may receive one or more thread from the valve fitting. For example, a space between a pair of tangs receives a thread. In these examples (FIG. 3), the fitting 26 acts as a receiver for the tapered cylinder.

Further, because the tapered cylinder 20 has threads or tangs on the inside, the tapered cylinder may act as a receiver, and the tapered cylinder may be threaded about a fitting 28 (FIG. 2) having threads on the outside or alternatively, if tangs are present on an inner surface, the tapered cylinder may be pushed over the valve fitting so that a valve fitting thread may be received by the tangs. In the tang embodiment, one thread may be received by one pair of tangs. Other securing means may be used to secure the tapered cylinder to the valve fitting.

Additionally, the tapered sides 30 of the tapered cylinder 20 allow fittings of various sizes to be threaded into or to receive the tapered cylinder 20. For example, if the fitting is of the type having threads or tangs on the outside (fitting 28, FIG. 2) and having a relatively small size or diameter as compared to the tapered cylinder diameter at its largest point, fitting 28 will be received at a relatively deep position within the tapered cylinder 20, as compared to a larger fitting. If the fitting is of a relatively large size it will not be threaded as deep within the tapered cylinder, as compared to a fitting having a smaller size.

Conversely, if the fitting is of a type having threads or tangs on the inside (fitting 26, FIG. 3), and if the fitting is relatively large with a large diameter, the tapered cylinder 20 will be threaded relatively deep into the fitting 26 as compared to where the fitting is relatively small.

Cylinder 20 surfaces, including the base 22, prevent at least some particles, such as dust, from entering the fitting 26 or 28, thus protecting the fitting. With reference to FIG. 3, particles enter the cylinder 20 while the base 22 and inner surface 33 act as a block preventing at least some particles from entering the fitting 26. With reference to FIG. 2, the cylinder 20 surrounds or caps the fitting so that the base and outer surface 31 prevent at least some of the particles from entering the fitting 28. Therefore, the tapered cylinder 20 may be used to protect fittings of various sizes and designs, and to subsequently protect fluid dispensed through the fittings, from particulate contamination.

What is claimed is:

1. A tamper notification and protection device for use with a valve, said valve including a first fitting to be protected, a second fitting connectable to a tank, and a burst disk, said device comprising:
   a tapered cylinder having an inner tapered surface and outer tapered surface each having a securing means on both said inner and said outer tapered surfaces, either of said securing means configured to allow mounting onto a valve fitting;
   a base extending across said tapered cylinder, said base positioned to inhibit particles from entering the first fitting;
   a first strap attached to one side of the tapered cylinder and bendable about the valve, said first strap having a ring through which said burst disk is insertable, said ring further having an extended base;
   a second strap attached to another side of the tapered cylinder and bendable about the valve; and
   a locking mechanism configured to fasten said locking mechanism to join said first strap to said second strap such that said locking mechanism indicates detachment when unlocked after locking, thereby providing a tamper notification.

2. The device of claim 1 further comprising a tab disposed on said first strap, said tab including perforations.

3. The device of claim 1 further comprising at least one indentation at which said first and second straps are bendable.

4. The device of claim 1 further comprising channels at which said first and second straps are bendable.

5. The device of claim 1 wherein said means for fastening includes a tongue included within said first strap.

6. The device of claim 5 wherein said means for fastening includes a tongue receiver included within said second strap.

7. The device of claim 6 wherein said tongue includes a saw edge fastenable to said tongue receiver.

8. The device of claim 7 wherein said tongue receiver includes a protrusion preventing said saw edge tongue from being retracted after insertion.

9. The device of claim 1 wherein said first strap is bendable at three locations and said second strap is bendable at one location, said straps forming a square-like shape when fastened to one another.

10. The device of claim 1 wherein said securing means are tangs.

11. A tamper notification and protection device for use with a valve, said valve including a first fitting to be protected, a second fitting connectable to a tank, and a burst disk, said device comprising:
    a tapered cylinder having an inner and outer surface configured to secure the cylinder onto a valve fitting;
    a base mounted within said tapered cylinder, said base positioned to inhibit particles from entering the first fitting; and
    a first strap and a second strap configured to be bendable about said valve, said first strap having a ring through which said burst disk is insertable, said ring further having an extended base, said tapered cylinder being disposed between said first strap and said second strap, and said first strap configured to be fastenable to said second strap.

12. The device of claim 11 further comprising a tab disposed on said first strap, said tab including perforations.

13. The device of claim 11 wherein said tapered cylinder having a base includes a first and a second open end each configured to allow mounting to a valve fitting, wherein at least one of said open ends includes tangs on both said inner surface and said outer surface.

14. The device of claim 11 wherein said first strap is bendable at three locations and said second strap is bendable at one location, said straps forming a square-like shape when fastened to one another.

15. A protection device for use with a valve, said valve including a valve fitting connectable to a distribution mechanism and a burst disk, said device comprising:
    a tapered cylinder having a first end and a second end, the second end including an inner tapered surface having a securing means, and an outer tapered surface having a securing means, said tapered cylinder attachable to valve fittings of various sizes by using one of either said securing means of said inner surface or said securing means of said outer surface; a base configured to inhibit particles from entering the valve fitting;
    a first strap attached to one side of the tapered cylinder and bendable about the valve, said first strap having a ring through which said burst disk is insertable, said ring further having an extended base;
    a second strap attached to another side of the tapered cylinder and bendable about the valve; and
    a fastener allowing joining of said first strap to said second strap, wherein said fastener, once fastened, cannot be unfastened without damaging said protection device such that tampering is evident.

* * * * *